(12) United States Patent
Ishikawa et al.

(10) Patent No.: US 11,231,725 B2
(45) Date of Patent: Jan. 25, 2022

(54) CONTROL SYSTEM FOR A FLYING OBJECT, CONTROL DEVICE THEREFOR, AND MARKER THEREOF

(71) Applicant: SPIRAL INC., Tokyo (JP)

(72) Inventors: Tomohiro Ishikawa, Tokyo (JP); Satoshi Hishida, Osaka (JP)

(73) Assignee: SPIRAL INC., Tokyo (JP)

( * ) Notice: Subject to any disclaimer, the term of this patent is extended or adjusted under 35 U.S.C. 154(b) by 0 days.

(21) Appl. No.: 16/490,110

(22) PCT Filed: Feb. 8, 2018

(86) PCT No.: PCT/JP2018/004326
§ 371 (c)(1),
(2) Date: Aug. 30, 2019

(87) PCT Pub. No.: WO2018/163699
PCT Pub. Date: Sep. 13, 2018

(65) Prior Publication Data
US 2020/0012297 A1  Jan. 9, 2020

(30) Foreign Application Priority Data

Mar. 6, 2017  (JP) .............................. JP2017-042267

(51) Int. Cl.
*G05D 1/10* (2006.01)
*B64D 47/08* (2006.01)
*B64C 39/02* (2006.01)

(52) U.S. Cl.
CPC .............. *G05D 1/10* (2013.01); *B64D 47/08* (2013.01); *B64C 39/02* (2013.01); *B64C 2201/027* (2013.01); *B64C 2201/141* (2013.01)

(58) Field of Classification Search
CPC .......... G05D 1/10; B64D 47/08; B64C 39/02; B64C 2201/027; B64C 2201/141; G01S 5/0063; G01S 5/0045
See application file for complete search history.

(56) References Cited

U.S. PATENT DOCUMENTS 8,515,609 B2 *  8/2013  McAndrew ............. B64C 19/00
                                                          701/23
9,845,164 B2 * 12/2017  Ahmed .................. B64D 47/08
(Continued)

FOREIGN PATENT DOCUMENTS

JP         281105      3/1990
JP       2003330539   11/2003
(Continued)

OTHER PUBLICATIONS

International Search Report for related International Application No. PCT/JP2018/004326 dated May 1, 2018.

*Primary Examiner* — Peter D Nolan
*Assistant Examiner* — Kenneth M Dunne
(74) *Attorney, Agent, or Firm* — Renner, Otto, Boisselle & Sklar, LLP

(57) ABSTRACT

A control system 2 for a flying object includes at least one marker 6, which corresponds to control information related to the control of the flying object, a reading unit 12 for reading the control information, and a flight information transmitting unit 14 for transmitting flight information to the flying object based on the control information read by the reading unit.

11 Claims, 12 Drawing Sheets

Df

| Cases | Control | Fail safe code |
|---|---|---|
| Can not find marker within predetermined time | Hover | F0001 |
| Can not find marker predetermined time or more | Go back to previous marker | F0002 |
| Abnormal approach within a predetermined distance | Hover | F0003 |
| Abnormal approach predetermined distance or more | Go in reverse | F0004 |
| Battery voltage drop | Land | F0005 |
| Communication error | Go back to landing base | F0006 |

(56) References Cited

U.S. PATENT DOCUMENTS

| | | | | |
|---|---|---|---|---|
| 9,964,951 B1* | 5/2018 | Dunn | .................... | G08G 5/0052 |
| 10,029,790 B2* | 7/2018 | Maekawa | .......... | H04N 5/23296 |
| 10,217,180 B2* | 2/2019 | Gubbi Lakshminarasimha | .......... | |
| | | | | G05D 1/0088 |
| 10,552,933 B1* | 2/2020 | Calhoon | ................ | G06T 1/0064 |
| 2017/0011333 A1* | 1/2017 | Greiner | ................ | G06Q 10/083 |
| 2017/0031369 A1* | 2/2017 | Liu | ....................... | G08G 5/0069 |
| 2019/0187724 A1* | 6/2019 | Li | .......................... | G05D 1/042 |
| 2020/0012829 A1* | 1/2020 | Davidson | ......... | G06K 19/06168 |

FOREIGN PATENT DOCUMENTS

| | | |
|---|---|---|
| JP | 2010061533 | 3/2010 |
| JP | 2014031118 | 2/2014 |
| JP | 2016111414 | 6/2016 |
| WO | 2016154869 | 10/2016 |
| WO | 2017169516 | 10/2017 |

\* cited by examiner

[Fig1]
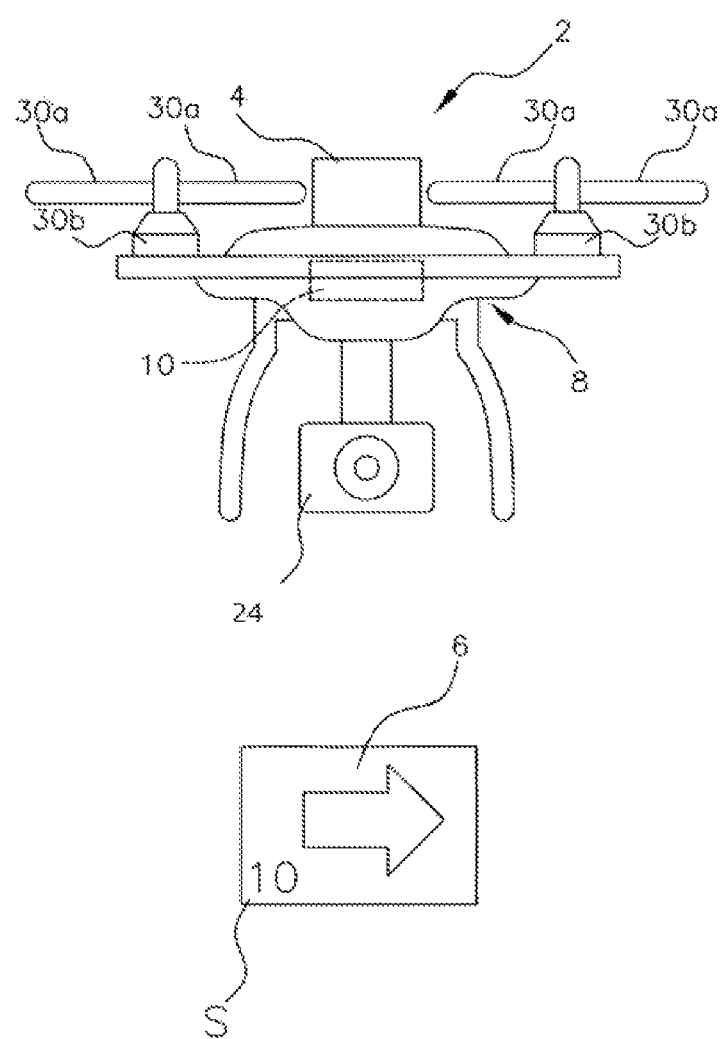

[Fig2]
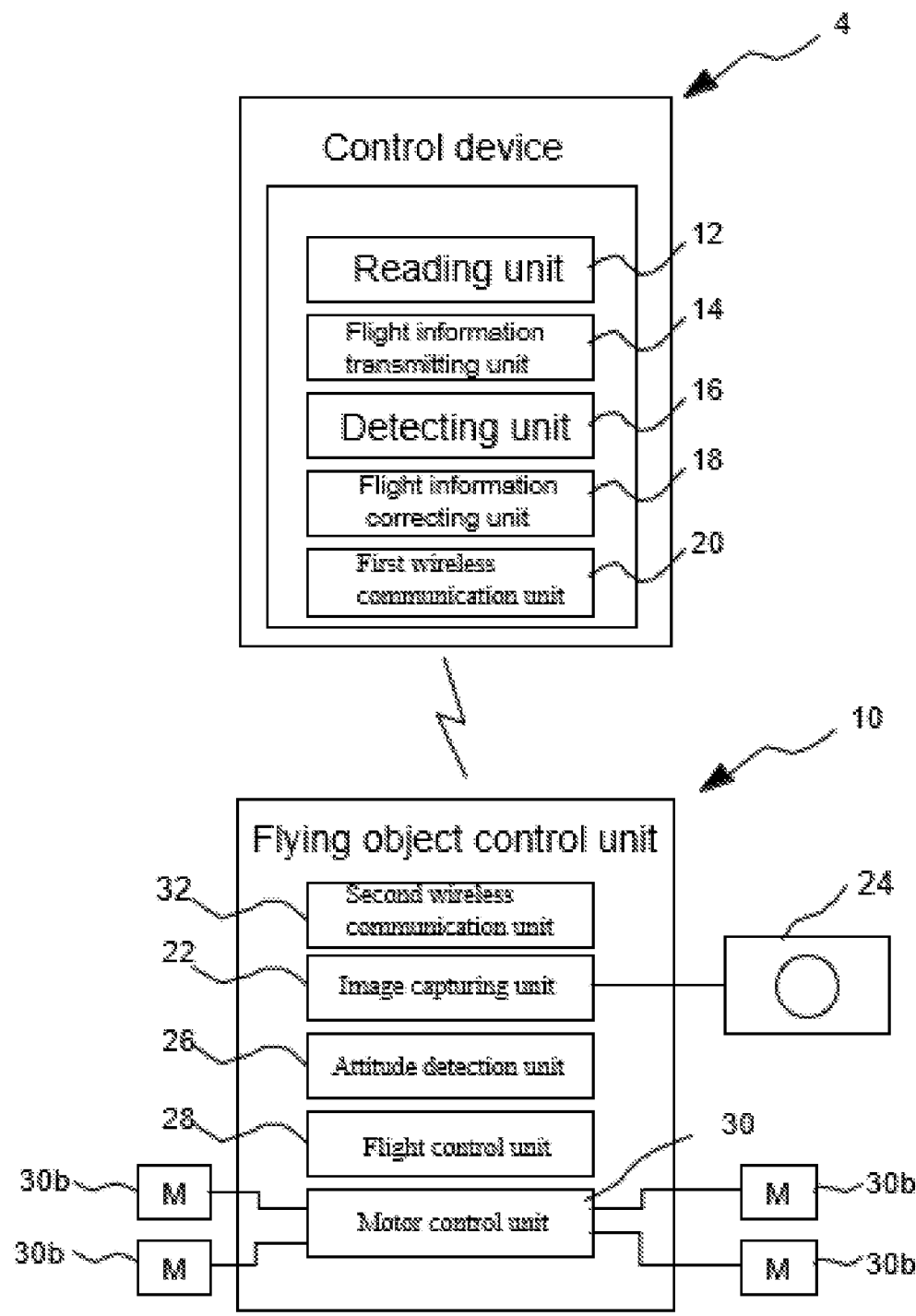

[Fig3]
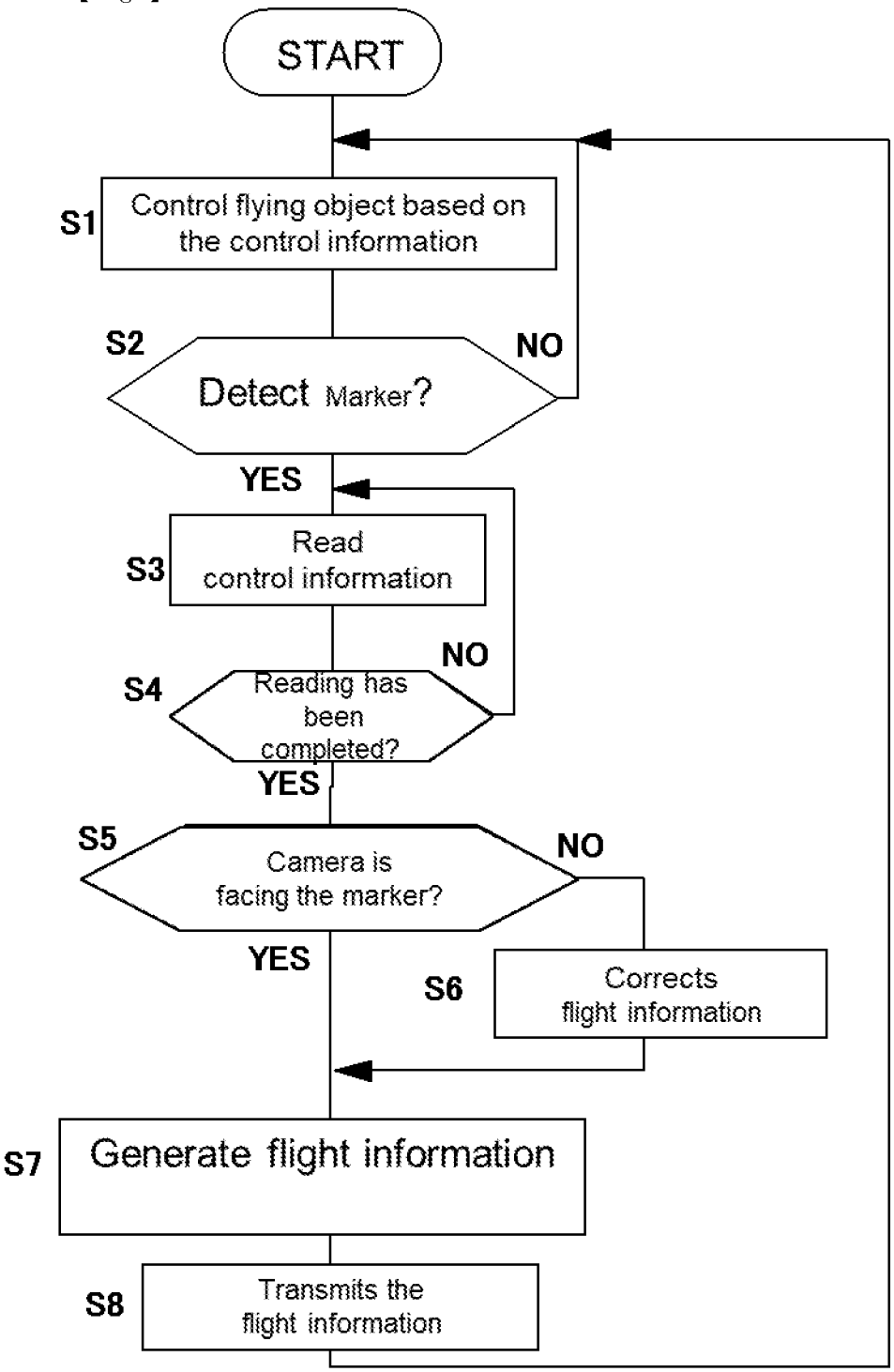

[Fig4]
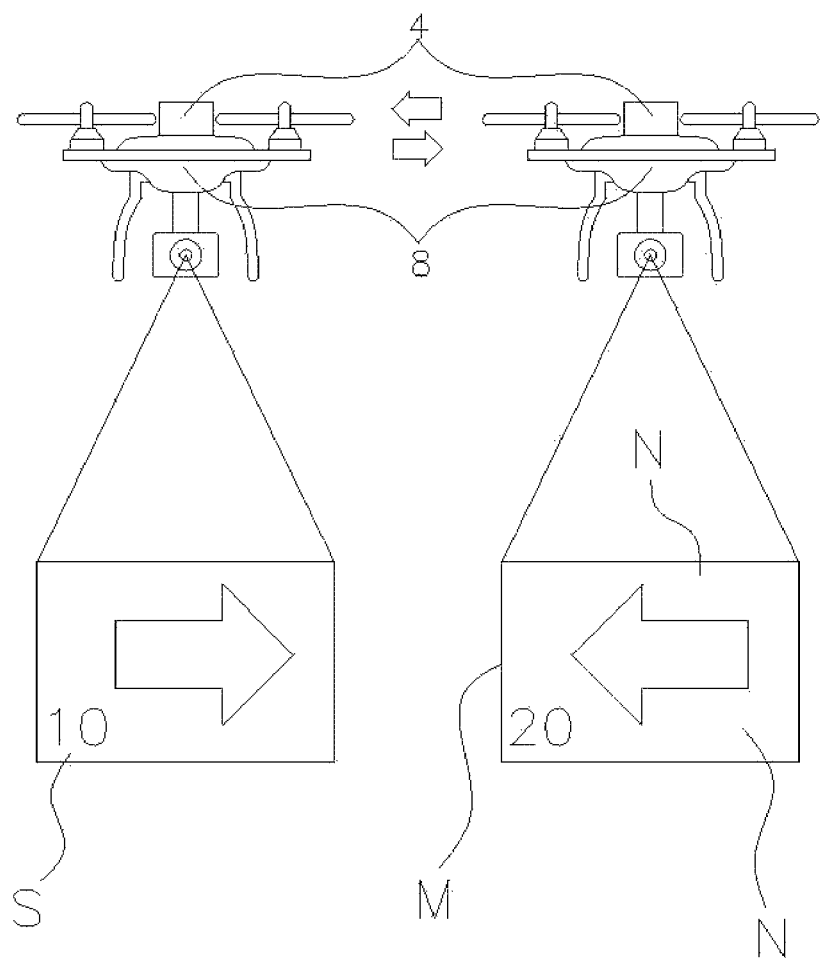
(6a) (6b)

[Fig5]
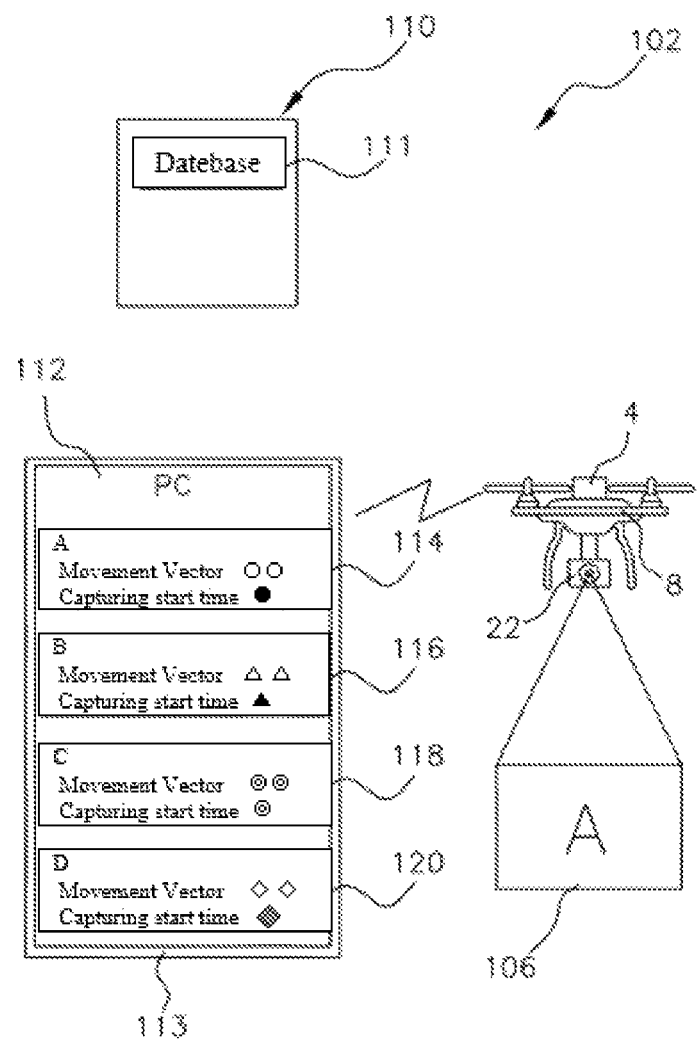

[Fig6]
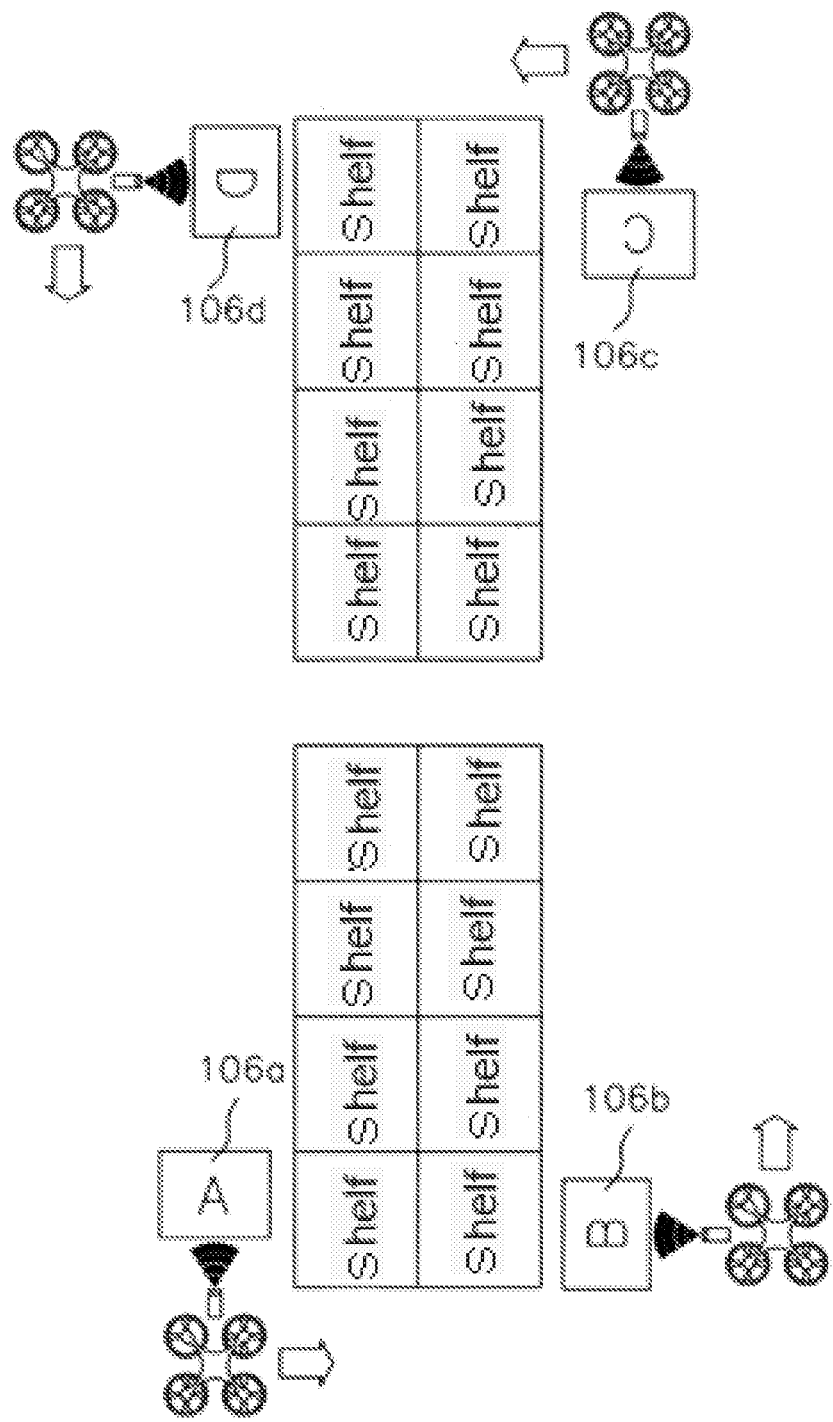

[Fig7]
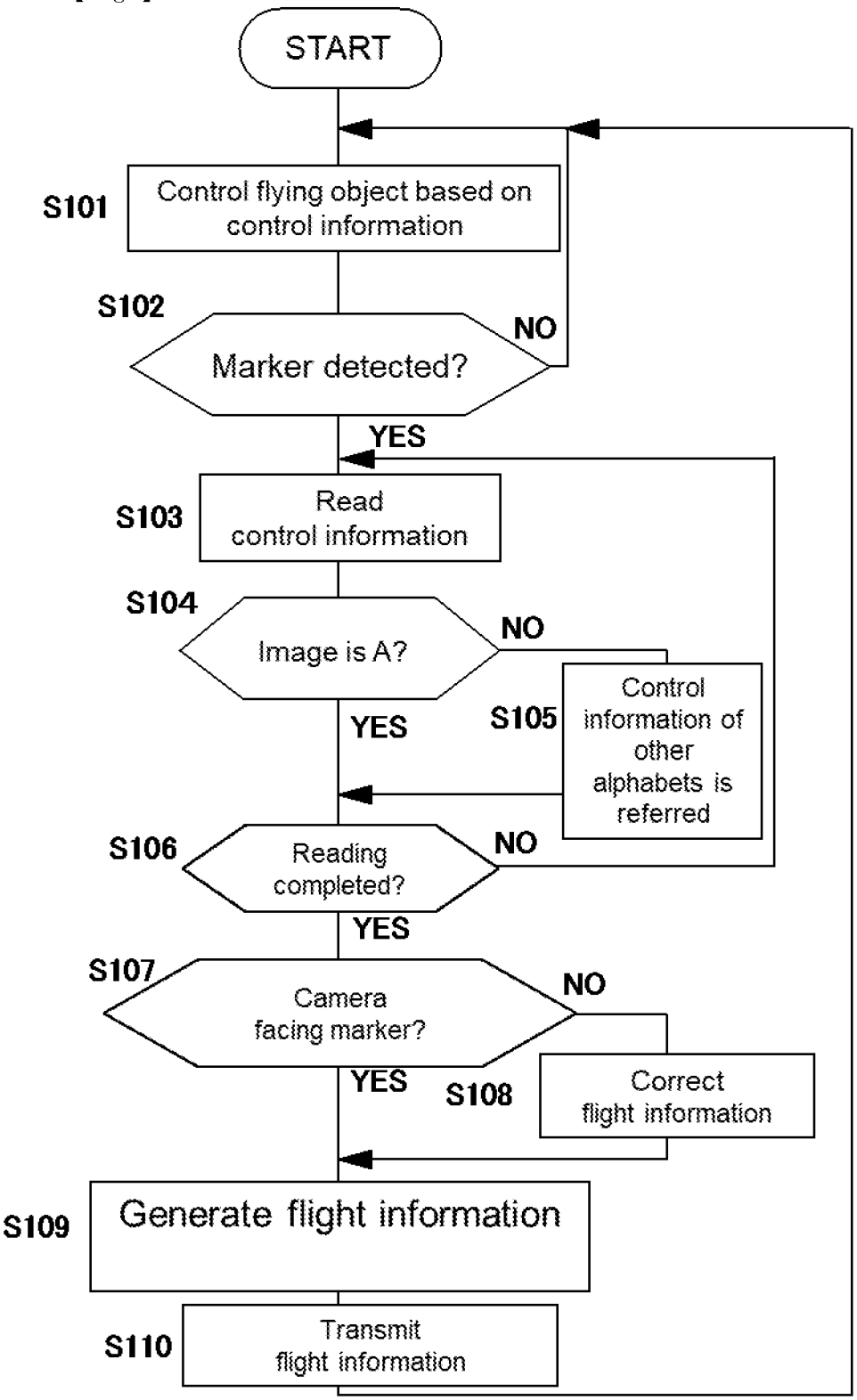

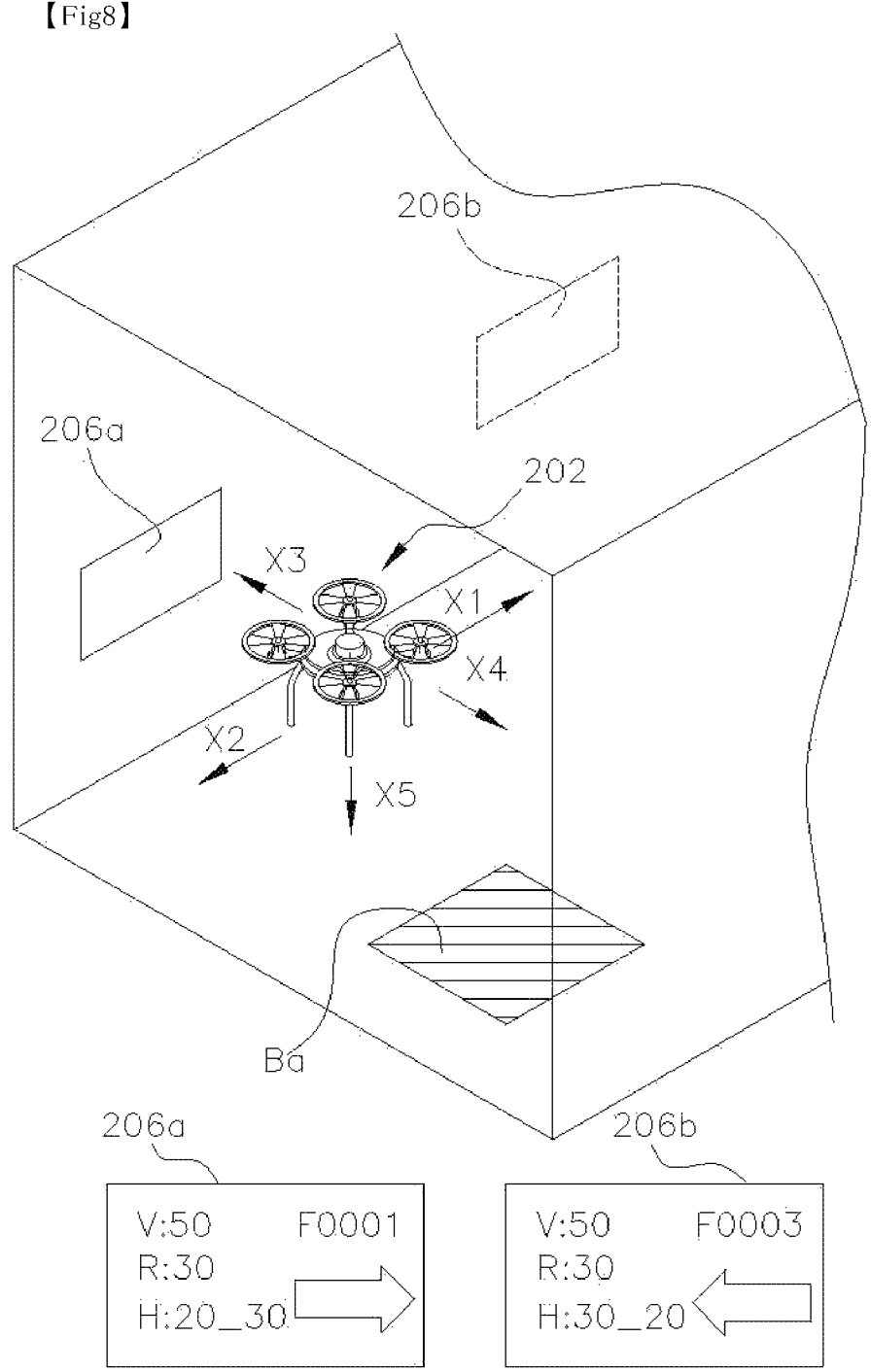

【Fig9】
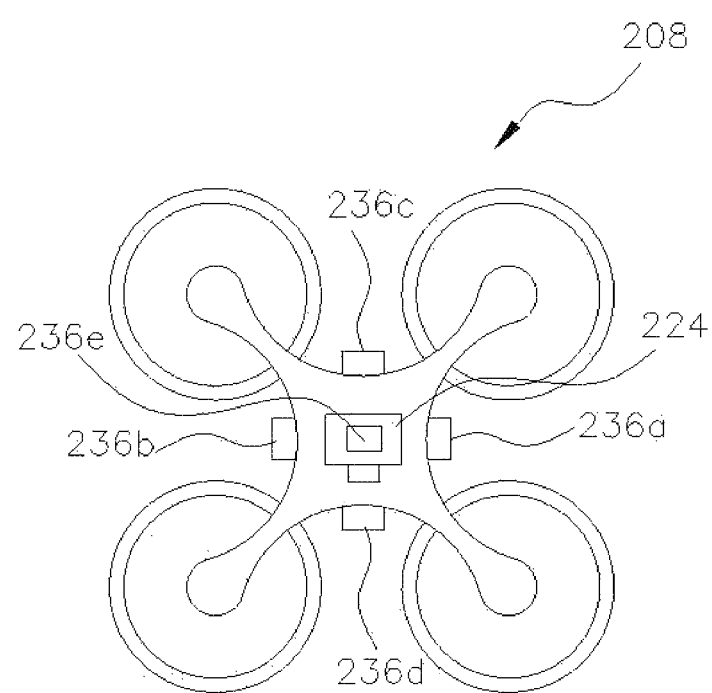

[Fig10]
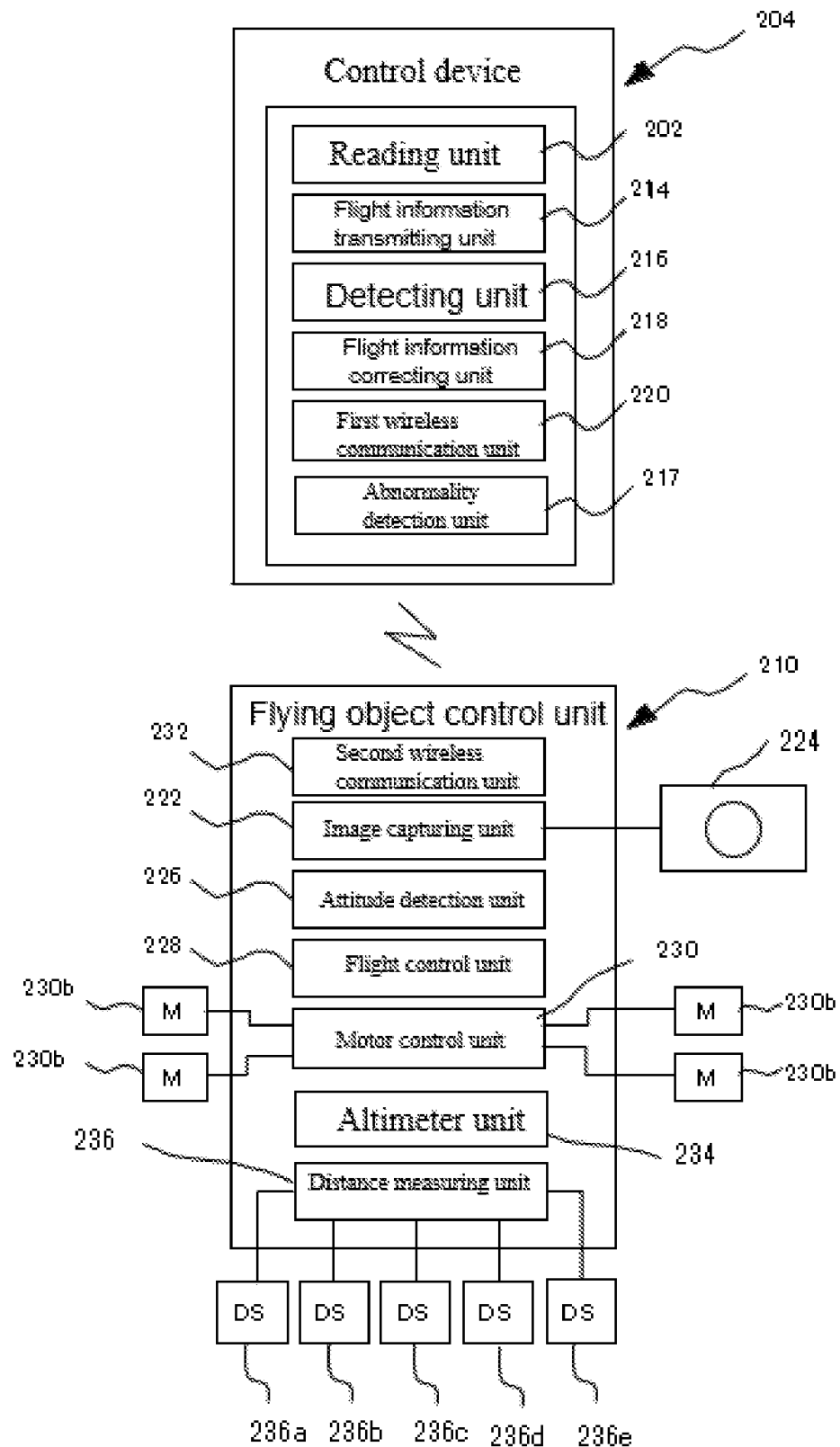

[Fig11]

| Cases | Control | Fail safe code |
|---|---|---|
| Can not find marker within predetermined time | Hover | F0001 |
| Can not find marker predetermined time or more | Go back to previous marker | F0002 |
| Abnormal approach within a predetermined distance | Hover | F0003 |
| Abnormal approach predetermined distance or more | Go in reverse | F0004 |
| Battery voltage drop | Land | F0005 |
| Communication error | Go back to landing base | F0006 |

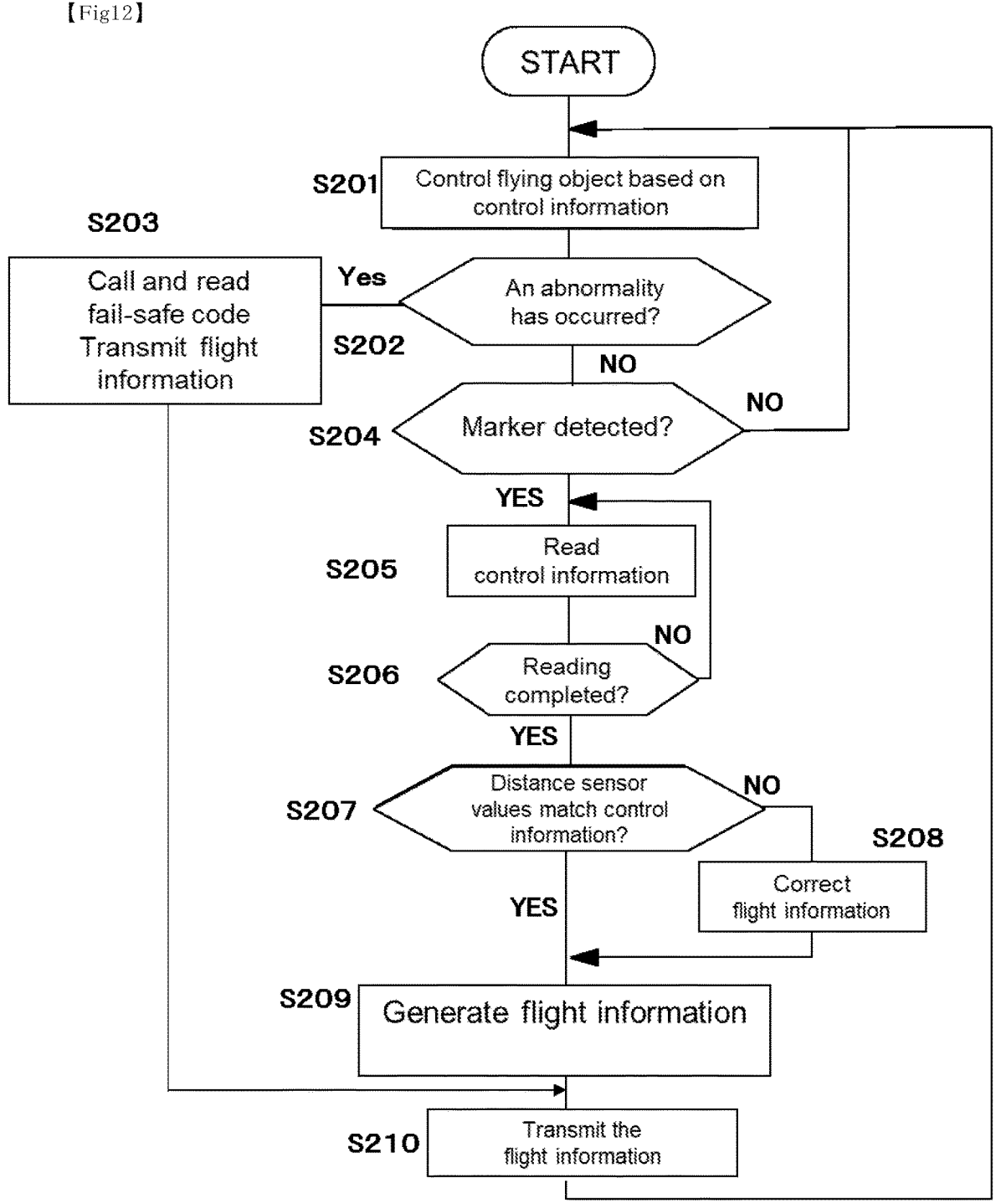
[Fig12]

CONTROL SYSTEM FOR A FLYING OBJECT, CONTROL DEVICE THEREFOR, AND MARKER THEREOF

TECHNICAL FIELD

This invention relates to a control system and a control device for a flying object, and more particularly to a flying object control system and a control device for a flying object used indoors.

BACKGROUND ART

A flying object for use indoors where a GPS (Global Positioning System) cannot be used is known. In the flying object described in Patent Document 1, the distance between the flying object and structures is measured, and a structure on a predetermined flight route is inspected. In the flying object of Patent Document 1, a three-dimensional flight route from the start of flight to the end of flight is stored in advance in a control device. The flying object is controlled to fly autonomously along the stored flight route.

PRIOR ART DOCUMENTS

Patent Documents

Patent Document 1: JPA2016-111414

DISCLOSURE OF INVENTION

Problem to be Solved by the Invention

According to the technology of Patent Document 1, when a three-dimensional flight route is stored in the control device, in a large indoor facility, for example, the amount of information prepared for the entire flight route becomes enormous. As a result, it takes time and labor to prepare the entire three-dimensional flight route. Furthermore, a storage device for storing the entire flight route in the control device becomes large.

It is an object of the present invention to autonomously fly a flying object without storing the entire flight route.

Means for Solving the Problem

A control system for a flying object according to the present invention is a control system for a flying object used for controlling the flying object. The flying object control system includes at least one marker, a reading unit, and a flight information transmitting unit. The at least one marker corresponds to control information relating to the control of the flying object. The reading unit reads control information from the marker. The flight information transmitting unit generates flight information in a form readable by the flying object based on the control information read by the reading unit and transmits the flight information to the flying object.

In the control system having such a configuration, the flight information transmitting unit transmits the flight information to the flying object based on the control information read from the marker by the reading unit. This makes it possible to autonomously fly the flying object without storing the entire flight route.

The flying object may include an image capturing unit for capturing an image described on the marker. The reading unit may read the control information from an image captured by the image capturing device. With such a configuration, the image capturing unit can read the control information for the flying object by capturing the image described on the marker. As a result, a measuring instrument such as a sensor becomes unnecessary in the marker, and the flying object can be controlled inexpensively.

The flying object control system may further comprise a flight information correction unit which corrects flight information read from the image. With such a configuration, for example, it is possible to correct the flight information by comparing the control information read by the reading unit with information on the actual flight.

The at least one marker may include a first marker and a second marker. The first marker may have at least first control information relating to a movement vector of the flying object to the second marker. With such a configuration, the flight information transmitting unit can transmit to the flying object flight information for moving to the second marker based on the first control information of the first marker read by the reading unit. As a result, the flying object can reliably fly based on the first marker to the second marker.

The flying object control system may further comprise a detection unit that detects the marker. The flight information transmitting unit generates flight information indicating hovering of the flying object when the marker is detected by the detecting unit. With such a configuration, when the detecting unit detects the marker, the flying object is made to hover. As a result, it is possible to prevent the flying object from passing the marker.

The flying object may have a distance sensor for measuring the distance between the flying object and structures surrounding the flying object. The marker may have second control information relating to a flight state calculated from information from the distance sensor. With such a configuration, the flying object can be controlled more accurately by using the distance sensor.

The flying object control system may further comprise an abnormality detection unit for detecting an abnormality of the control system for the flying object. The marker may have third control information relating to the abnormality detected by the abnormality detecting unit. According to this configuration, the flying object can be controlled more safely.

The control device according to the present invention may comprise a reading unit and a flight information transmitting unit. The reading unit reads control information of at least one maker corresponding to control information relating to control of the flying object. The flight information transmitting unit generates flight information in a form readable by the flying object and transmits the flight information to the flying object based on the control information read by the reading unit.

In the control device having such a configuration, the flight information transmitting unit can transmit the flight information to the flying object based on the control information read from the marker by the reading unit. As a result, the flying object can autonomously fly without storing the entire flight route.

The marker according to the present invention may be a marker used in a control system for a flying object used for controlling a flying object and may include first control information relating to a movement vector of the flying object, second control information relating to the flight condition of the flying object, and third control information relating to abnormalities of the flying object control system.

According to this configuration, it is possible to accurately and safely autonomously fly the flying object without storing the entire flight route.

Effects of the Invention

According to the present invention, it is possible to autonomously fly a flying object without using a GPS and without storing the entire flight route.

BRIEF DESCRIPTION OF THE DRAWINGS

FIG. 1 is an overall view of a control system for a flying object according to a first embodiment of the present invention.

FIG. 2 is a block diagram showing the configuration of the control device and the flying object control unit.

FIG. 3 is a flowchart showing the control operation of the control device in the first embodiment.

FIG. 4 is a diagram showing the operation of the control system for a flying object according to the first embodiment.

FIG. 5 is an overall view of a control system for a flying object according to a second embodiment.

FIG. 6 is a diagram showing the operation of the control system for a flying object according to the second embodiment.

FIG. 7 is a flowchart showing the control operation of the control device in the second embodiment.

FIG. 8 is an overall view of a control system for a flying object according to a third embodiment.

FIG. 9 is a bottom view of the flying object according to the third embodiment.

FIG. 10 is a block diagram showing a configuration of a control device and a flying object control unit in the third embodiment.

FIG. 11 is a table of fail-safe codes in the third embodiment.

FIG. 12 is a flowchart showing the control operation of the control device in the third embodiment.

DETAILED DESCRIPTION OF THE INVENTION

First Embodiment

Below, a first embodiment will be described with reference to the drawings.

As shown in FIG. 1 and FIG. 2, a control system 2 for a flying object 8 according to the first embodiment of the present invention includes a control device 4 having a reading unit 12 and at least one marker 6.

As shown in FIG. 1, the control device 4 is secured to an upper portion or a lower portion of the flying object 8. As shown in FIG. 2, the control device 4 includes a microcomputer capable of performing image processing and includes CPU, RAM, ROM, and I/O interfaces. The control device 4 also includes wireless communication devices such as Wi-Fi (registered trademark) and Bluetooth (registered trademark). The control device 4 has a functional configuration configured by software which includes a reading unit 12, a flight information transmitting unit 14, a detecting unit 16, a flight information correcting unit 18, and a first wireless communication unit 20.

The reading unit 12 receives an image S of the marker 6 captured by the image capturing unit 22, which will be described later. After receiving the image S, the reading unit 12 reads the control information included in the image S by image processing. The reading unit 12 corresponds to a program for reading control information from the acquired image S. For example, when an arrow is described (displayed) as control information in the image S of the marker 6, the reading unit 12 refers to a program stored in advance in the control device 4 and reads the movement vector indicated by the arrow in the image S. In this manner, the reading unit 12 reads control information such as the moving direction and the amount of movement of the flying object 8, the operating condition of the image capturing unit 22, etc., from the control information included in the image S. That is, the reading unit 12 generates control information represented by a numerical value that can be interpreted by a program from control information represented by an arrow that is a two-dimensional image. The reading unit 12 sends the control information which was read to the flight information transmitting unit 14.

The flight information transmitting unit 14 converts the received control information into a signal of flight information in a format readable by the flying object control unit 10 of the flying object 8, and it sends the signal to the first wireless communication unit 20. In the present embodiment, the data format of the flight information that can be accepted by the flying object 8 is determined in advance. The flight information transmitting unit 14 generates flight information of a predetermined data format based on the control information.

The detecting unit 16 detects whether or not the flying object 8 has passed the marker 6. In the first embodiment, the detecting unit 16 detects whether or not the image capturing unit 22 has imaged the marker 6. The detecting unit 16 sends a signal indicating hovering to the flight information transmitting unit 14 when the marker 6 is detected. The flight information transmitting unit 14 converts the received hovering signal into a flight information signal in a format readable by the flying object control unit 10 of the flying object 8, which will be described later, and sends the flight information signal to the first wireless communication unit 20.

The flight information correcting unit 18 corrects the flight information from the image information of the image S obtained from the image capturing unit 22 of the flying object 8. Details of the correction process will be described later.

The first wireless communication unit 20 converts a signal transmitted from the flight information transmitting unit 14 into a communication signal and transmits the communication signal to a second wireless communication unit provided in the flying object control unit 10, which will be described later.

As shown in FIG. 1, the marker 6 includes control information for the flying object 8. An image S including the control information for the flying object 8 is displayed on the marker 6. The image S of the marker 6 corresponds at least to the control information of the flying object 8 relating to the movement vector to the next marker 6. The movement vector includes a moving distance and a moving direction (first control information) of the flying object 8. In addition, the altitude of the flying object 8 may be included. The marker 6 is disposed at an arbitrary position on the flight route.

As shown in FIG. 1, the flying object 8 is an unmanned flying object (e.g., a drone) including a flying object control unit 10, a plurality of (e.g., four) propellers 30a, and a camera 24.

As shown in FIG. 2, the flying object control unit 10 includes an image capturing unit 22, an attitude detection unit 26, a flight control unit 28, a motor control unit 30, and a second wireless communication unit 32. The flying object control unit 10 includes a microcomputer including CPU, RAM, ROM, gyros, acceleration sensors, and I/O interfaces. The flying object control unit 10 also includes wireless communication devices such as Wi-Fi (registered trademark) and Bluetooth (registered trademark), and it controls the respective units by software.

The image capturing unit 22 is electrically connected to the camera 24, and the imaging timing and the length of imaging are set based on a signal from the flight information transmitting unit 14. The image capturing unit 22 starts the camera 24 and performs imaging based on the set imaging timing and length of imaging.

The attitude detection unit 26 measures values of an acceleration sensor (not shown) and a gyro (not shown) and detects the tilt, speed, moving direction, and the like of the flying object 8.

The flight control unit 28 determines the outputs of the four motors 30b that respectively drive the four propellers 30a based on the signal sent from the flight information transmitting unit 14 and the attitude of the flying object 8 detected by the attitude detection unit 26, and it sends a signal to the motor control unit 30.

The motor control unit 30 individually controls the motors 30b that drive the propellers 30a based on a signal from the flight control unit 28.

The second wireless communication unit 32 receives the communication signal from the first wireless communication unit 20 and transmits a signal containing flight information to the flight control unit 28. On the other hand, the image captured by the camera 24 is transmitted to the first wireless communication unit 20 via the image capturing unit 22.

Next, an example of a processing procedure performed by the control device 4 will be described with reference to the flowchart of FIG. 3. The control device 4 starts when an unillustrated power switch is pressed.

In the first embodiment, as shown in FIG. 4, marker 6 includes two markers 6a and 6b. Marker 6a (a first marker) corresponds to control information for bringing marker 6b and the camera 24 into a state in which they face each other after the flying object 8 moves from marker 6a to marker 6b (a second marker). More specifically, an arrow (see the right arrow above 6a in FIG. 4) and a number (see the number 10 above 6a of FIG. 4) corresponding to the imaging start time of the image capturing unit 22 at marker 6b are described (displayed) as an image S in a rectangular frame of marker 6a. On the other hand, the interior of the rectangular frame of marker 6b corresponds to control information for returning to marker 6a and bringing marker 6a and the camera 24 into a face-to-face relation with each other. More specifically, an arrow (see the left arrow above 6b of FIG. 4) and a number (see the number 20 in above 6a of FIG. 4) corresponding to the image capturing starting time of the image capturing unit 22 at marker 6b are described (displayed) as an image N on marker 6b.

As shown in FIG. 3, in step S1, the control device 4 controls the flying object 8 based on the control information obtained from marker 6a until the detecting unit 16 detects marker 6b. That is, the flight information transmitting unit 14 of the control device 4 transmits the flight information for moving to marker 6b to the first wireless communication unit 20. The first wireless communication unit 20 converts the flight information from the flight information transmitting unit 14 into a communication signal, transmits the communication signal to the second wireless communication unit 32, and advances processing to step S2. Thereafter, the flying object control unit 10 of the flying object 8 controls the flying object control unit 10 based on the flight information transmitted from the control device 4. The flying object 8 moves to marker 6b under the control of the flying object control unit 10.

In S2, the control device 4 determines whether or not the detecting unit 16 has detected marker 6b. When the detecting unit 16 detects marker 6b, the flight information transmitting unit 14 transmits to the first wireless communication unit 20 flight information which directs the flying object 8 to hover, and the process proceeds to S3. Thereafter, the flying object control unit 10 receives the flight information for hovering from the flight information transmitting unit 14, and it controls the motor control unit 30 via the flight control unit 28 so as to hover. The flying object 8 hovers under the control of the flying object control unit 10.

On the other hand, when the detecting unit 16 does not detect marker 6b, the process returns to step S1, and the flight information transmitting unit 14 continues to transmit flight information for moving toward marker 6b to the first wireless communication unit 20.

In step S3, the reading unit 12 reads the image N displayed on marker 6b. The reading unit 12 sends signals to the flight information transmitting unit 14 so as to start imaging after a predetermined time elapses after the hovering, based on the control information on the number corresponding to the imaging start time of marker 6a. The flight information transmitting unit 14 issues an instruction for capturing an image to the image capturing unit 22 of the flying object control unit 10 via the first wireless communication unit 20 and the second wireless communication unit 32 after a predetermined time has elapsed after the hovering. The image capturing unit 22 causes the camera 24 to form an image N of marker 6b. The image capturing unit 22 reads the image N captured by the camera 24. The image capturing unit 22 transmits the captured image N to the reading unit 12 via the second wireless communication unit 32 and the first wireless communication unit 20. The reading unit 12 reads the corresponding control information from the image N. That is, the reading unit 12 performs image processing on the image N based on a program stored in the control device 4 in advance and reads control information included in the image N such as the moving distance, the moving direction, and the altitude to which the flying object 8 should be moved, and an imaging start time of the camera 24. Here, the image N corresponds to the control information for moving the flying object 8 to marker 6a and the control information of the imaging start time at marker 6a. Therefore, the reading unit 12 reads the moving distance, the moving direction, the altitude, and the imaging time at which the flying object 8 should move to marker 6a. When the reading unit 12 starts reading the control information, the process proceeds to step S4.

In step S4, the reading unit 12 determines whether or not reading has been completed. When it is determined that reading is completed, the process proceeds to step S5. On the other hand, when reading by the reading unit 12 is not completed, the process returns to step S3, and the image capturing unit 22 continues imaging.

In step S5, the flight information correcting unit 18 corrects the flight information. As shown in FIG. 4, the flight information correcting unit 18 measures, for example, the length of the long side L, the length of the short side M, and the angle between L and M of the image N shown in FIG. 4, the angle of the camera 24 with respect to marker 6b, and the distance between the camera 24 and marker 6b. That is to say, when flying accurately to marker 6b based on the control information of marker 6a, the camera 24 faces marker 6b. Also, if the camera 24 is directly opposite marker 6b, the angle between L and M should be a right angle, and the lengths of L and M should also be predetermined lengths. On the other hand, when L and M are not perpendicular to each other or the lengths of L and M are not predetermined lengths as a result of the actual imaging of the image N by the camera 24, it is considered that the actual flight route has deviated from the control information corresponding to marker 6a. Therefore, in step S5, the flight information correcting unit 18 determines whether or not the camera 24 is facing marker 6b, and if it is determined that the camera 24 is not facing marker 6b, the process proceeds to step S6. On the other hand, if the camera 24 is directly opposite the maker, the process proceeds to step S7.

In step S6, the flight information correcting unit 18 calculates the amount of deviation of the actual flight route based on the image information of the image N, it corrects flight information in which the amount of deviation is reflected in the control information of marker 6b, and it advances the process to step S7.

In step S7, the flight information transmitting unit 14 adds the control information from the reading unit 12 and the correction information from the flight information correcting unit 18 to generate flight information for moving to marker 6a, and the process proceeds to step S8.

In step S8, the flight information transmitting unit 14 transmits the flight information to the flying object control unit 10 via the first wireless communication unit 20 and the second wireless communication unit 32, and the process proceeds to step S1. Subsequently, the flying object control unit 10 receives the flight information and controls the motor control unit 30 via the flight control unit 28. The flying object control unit 10 moves the flying object 8 to marker 6a.

In the control system 2 and the control device 4 of the flying object having the configuration of the first embodiment as described above, since the control information included in the marker 6 can be read by the reading unit 12 and the flying object 8 can be controlled, the flying object can be made to fly autonomously without using a GPS. In addition, the flying object 8 can autonomously fly without storing the entire flight route in the flying object 8. In addition, the image capturing unit 22 captures an image described (displayed) on the marker 6, whereby the control information for the flying object can be read. As a result, a sensor or the like becomes unnecessary for the marker, and a control system for the flying object can be provided at low cost. In addition, since the flight information correcting unit 18 can correct the flight information from the image, it is possible to more accurately grasp the next marker and accurately fly in accordance with the control information of the marker, for example. Furthermore, because the control device 4 makes the flying object 8 hover when it detects the marker 6, it is possible to perform imaging in a stable state. As a result, the control information can be read accurately. When the control system 2 and the control device 4 of such a flying object are used in a large indoor warehouse, the flying object 8 can be made to fly freely in accordance with the control information indicated by the marker 6. In addition, the image capturing unit 22 can pick up an image of the inside of the warehouse while autonomously flying the flying object 8. As a result, the inside of the warehouse can be monitored by the flying object 8. In particular, the tops of shelves located in a warehouse are difficult to monitor by a person. By using the control system 2 and the control device 4 of the flying object of the first embodiment, it is possible to monitor the warehouse inexpensively and easily. Furthermore, in the control system 2 and the control device 4 of the flying object of the first embodiment, since the control device 4 is attached to the flying object 8, communication between the flying object 8 and the control device 4 is not disturbed by an obstacle. As a result, it is possible to perform stable autonomous flight. In addition, in the case of the control system for the flying object of the first embodiment, it is unnecessary for the control device 4 to store a three-dimensional flight route. Therefore, the capacity of the storage medium of the control device 4 can be reduced. As a result, the control device 4 becomes light weight, and it is possible to prevent the flight time of the flying object 8 from being shortened due to an increase in weight.

Second Embodiment

Next, a control system for a flying object according to a second embodiment will be described with reference to FIGS. 5 and 6. The flying object control system 102 of the second embodiment includes a control device 4, a marker 106, a flying object 8, a server 110, and a personal computer 112. The control device 4 and the flying object 8 are the same as those of the control device 4 and the flying object 8 in the first embodiment, and therefore a description thereof will be omitted.

As shown in FIG. 6, letters A to D are displayed in rectangular frames in a marker 106a to a marker 106d. As shown in FIG. 6, marker 106a to marker 106d are arranged so as to surround indoor shelves.

As shown in FIG. 5, a server 110 is connected to a personal computer 112 via the Internet or a wireless LAN. The server 110 has a functional configuration which includes a database 111. The server 110 may be implemented by hardware, a digital signal processor (DSP), or software. For example, in the case of software, the database 111 actually includes a CPU, a RAM, a ROM, and the like of a computer, and it is realized by the operation of a program stored in a recording medium such as a RAM, a ROM, a hard disk, or a semiconductor memory. The database 111 stores control information on a large number of movement vectors and imaging times corresponding to the letters of the marker 106.

The personal computer 112 is provided with a user interface 113 for combining control information corresponding to the letters of the marker 106. The personal computer 112 can be configured by any of hardware, a digital signal processor, and software. For example, in the case of software, the user interface 113 actually includes a CPU, a RAM, a ROM, and the like of a computer, and it is realized by operating a program stored in a recording medium such as a RAM, a ROM, a hard disk, or a semiconductor memory. The personal computer 112 includes a wireless communication device such as Wi-Fi (registered trademark) or Bluetooth (registered trademark), and a wired communication device such as a local area network (LAN). Each unit is controlled by software.

In the user interface 113, letters corresponding to the combination of the movement vector and the imaging time are displayed. In the present embodiment, for example, the user interface 113 displays the combination 114 of the movement vector and the image capturing start time for letter A, the combination 116 of the movement vector and the image capturing start time for letter B, the combination 118 of the movement vector and the image capturing start time for letter C, the combination 120 of the movement vector and the image capturing start time for letter D.

A user of the personal computer 112 accesses the database 111 of the server 110 via the Internet. The user refers to the control information corresponding to each letter stored in the database 111. The user of the personal computer 112 can create a combination of control information in accordance with the usage environment of the flying object 8 using the user interface 113.

The control information combined by the user interface 113 is stored in the control device 4 via a wired communication device or a wireless communication device provided in the personal computer 112. In addition, the reading unit 12 corresponds to a program for reading the images described (displayed) in marker 106a to marker 106d and for referring to the control information corresponding to the letters stored in the control device 4.

Next, an example of a processing procedure of the control device 4 in the control system 102 of the flying object will be described with reference to FIG. 7. In the present embodiment, as shown in FIG. 6, it is assumed that the flying object 8 flies while circulating around shelves (obstacles) in a room. In addition, in the present embodiment, as shown in the flowchart of FIG. 7, an example of a processing procedure when the flying object autonomously flies from marker 106d (a first marker) to marker 106a (a second marker) is shown.

In step S101, the control device 4 performs control based on the control information obtained from marker 106d until the detecting unit 16 detects marker 106a. That is, the flight information transmitting unit 14 transmits the flight information for moving to marker 106a to the first wireless communication unit 20. The first wireless communication unit 20 converts the signal from the flight information transmitting unit 14 into a communication signal, transmits the communication signal to the second wireless communication unit 32, and advances the process to step S102. Thereafter, the flying object control unit 10 of the flying object 8 controls the flying object control unit 10 based on the signal of the flight information transmitted from the control device 4. The flying object 8 moves to marker 106a under the control of the flying object control unit 10.

In step S102, the detecting unit 16 determines whether or not marker 106a has been detected. When the detecting unit 16 detects marker 106a, the flight information transmitting unit 14 transmits flight information for the flying object 8 to hover to the first wireless communication unit 20, and the process proceeds to step S103. Subsequently, the flying object control unit 10 receives flight information for hovering from the flight information transmitting unit 14, and it controls the motor control unit 30 via the flight control unit 28 so as to hover. The flying object 8 hovers under the control of the flying object control unit 10.

On the other hand, when the detecting unit 16 does not detect marker 106a, the process returns to step S101, and the flight information transmitting unit 14 continues to transmit the flight information for traveling to marker 106a to the first wireless communication unit 20.

In step S103, the reading unit 12 reads the images described (displayed) on marker 106a. The reading unit 12 refers to the imaging start time included in the control information for the letter D stored in the reading unit 12. The reading unit 12 sends a signal to the flight information transmitting unit 14 so as to start imaging after a predetermined time elapses after hovering based on the control information about the imaging start time included in the control information for the letter D of marker 106d. The flight information transmitting unit 14 issues an instruction for imaging to the image capturing unit 22 of the flying object control unit 10 via the first wireless communication unit 20 and the second wireless communication unit 32, and it advances the process to step S104. Thereafter, the image capturing unit 22 of the flying object control unit 10 causes the camera 24 to capture an image of marker 106a. The image capturing unit 22 reads an image of the marker 106 captured by the camera 24. When the imaging is completed, the image capturing unit 22 transmits the captured image to the reading unit 12 via the second wireless communication unit 32 and the first wireless communication unit 20.

In step S104, the reading unit 12 determines by image processing whether or not the image transmitted from the image capturing unit 22 is the letter A. The reading unit 12 starts the program stored in the reading unit 12 after determining that it is the letter A. The reading unit 12 refers to and reads the control information corresponding to the stored letter A based on the program stored in the reading unit 12. The reading unit 12 generates a control signal based on the control information corresponding to the letter A which was read. Here, the control information corresponding to the letter A includes information on a movement vector of a moving distance, a moving direction, and the altitude of the flying object 8, which are necessary for moving to the next marker 106b, and control information on an imaging start time at which imaging is started at the next marker. When the reading unit 12 starts the generation of the control signals, the process proceeds to step S105. On the other hand, when the reading unit 12 determines that the character is a character other than the letter A, the process proceeds to step S106.

In step S106, the reading unit 12 refers to the control information of other letters. For example, when the reading unit 12 determines that the letter which was read is the letter B, it refers to the control information corresponding to the letter B. The reading unit 12 performs the same process on the letter C and the letter D. The reading unit 12 refers to the control information corresponding to the respective letters, and after reading the control information, the process proceeds to step S106.

In step S106, when the reading unit 12 has finished creating the control signals, it is determined that reading has been completed, and the process proceeds to step S107. On the other hand, when the reading by the reading unit 12 has not been completed, the process returns to step S103, and the image capturing unit 22 continues imaging.

Since the processing method from step S107 to step S110 is the same as the processing method from step S5 to step S8 of the first embodiment, an explanation thereof will be omitted.

In this manner, the control device 4 generates flight information from the control information combined by the user interface 113 and the image transmitted from the image capturing unit 22, and the flying object 8 circulates around the shelves (obstacles).

In the flying object control system 102 having the configuration of the second embodiment as described above, the control information can be appropriately changed by using the personal computer 112 and the server 110, and the marker corresponding to the control information can be easily created. As a result, for example, even when it is desired to change the course of autonomous flight of the flying object 8, the flight route can be easily set by merely connecting the personal computer 112 to the server 110 and changing the combination of the control information. Also, the flight route can be easily changed by changing the arrangement of marker 106a to marker 106d. For this reason, it is possible to provide a control system and a control device for an autonomous flight type flying object with high versatility which can easily cope with a layout change of a large-scale indoor warehouse or the like.

Third Embodiment

Next, a control system 202 for a flying object according to a third embodiment will be described with reference to FIGS. 8, 9, and 10. With respect to the third embodiment, only the differences from the first embodiment will be described.

As shown in FIGS. 8 and 9, in the control system 202 of the flying object of the third embodiment, in addition to the configuration of the first embodiment, the flying object 208 includes a first distance sensor 236a for measuring the distance between the flying object 208 and surrounding structures, a second distance sensor 236b, a third distance sensor 236c, and a fourth distance sensor 236d. In addition, the flying object 208 has a fifth distance sensor 236e for measuring the distance from structures located below the flying object 208.

Also, as shown in FIG. 8, in addition to the control information (first control information) of the movement vector of the first embodiment, the flight speed V, the distance R to the structure, and the relative height H in the interior, which are control information (second control information) relating to the flight state of the flying object 208 at each marker, are described (displayed) in a marker 206a and a marker 206b. Further, a fail-safe code in which control information (third control information) relating to a countermeasure method for an abnormality that has occurred during the flight of the flying object 208 between marker 206a and marker 206b is described (displayed) in marker 206a and marker 206b. Marker 206a and marker 206b are disposed at a distance from each other on an indoor wall surface or a tunnel wall surface.

As shown in FIG. 9, the first distance sensor 236a to the fourth distance sensor 236d are disposed on four sides of the body of the flying object 208. The fifth distance sensor 236e is disposed below the body of the flying object 208. The first distance sensor 236a to the fifth distance sensor 236e are sensors that measure the distance to structures using, for example, ultrasonic waves or a laser. The first distance sensor 236a through the fourth distance sensor 236d separately measure the distances from structures in the forward direction (X1 in FIG. 8), the backward direction (X2 in FIG. 8), the rightward direction (X3 in FIG. 8), and the leftward direction (X4 in FIG. 8) with respect to the traveling direction of the flying object 208. Similarly, the fifth distance sensor 236e measures the distance from a structure in the downward direction (X5 in FIG. 8) of the flying object 208. That is, the fifth distance sensor 236e measures the relative height of the flying object 208 indoors. The first distance sensor 236a to the fifth distance sensor 236e may be arranged in any manner such that each distance sensor can function. The first distance sensor 236a through the fourth distance sensor 236d may be disposed on each of the four legs of the flying object 208.

As shown in FIG. 10, the control device 204 includes an abnormality detection unit 217 in addition to the configuration of the first embodiment. The flying object control unit 210 includes a distance measuring unit 236 in addition to the configuration of the first embodiment. The flying object control unit 210 also includes an altimeter unit 234 that measures the altitude of the flying object 208 using air pressure.

The distance measuring unit 236 of the flying object control unit 210 aggregates the distance from structures measured by the first distance sensor (see DS in FIG. 10) 236a through the fourth distance sensor 236d for each direction with respect to the traveling direction of the flying object 208 and determines the distance between the flying object 208 and structures around the flying object 208 in each direction. The distance measuring unit 236 transmits the distance in each direction to the control device 204 via the second wireless communication unit 232.

The flight information correcting unit 218 of the control device 204 calculates a change in the distance in the forward direction (X1 in FIG. 8) and the rearward direction (X2 in FIG. 8) of the flying object 208 from the distance information received from the distance measuring unit 236, and it calculates the flight speed Vd and the acceleration Va of the flying object 208. In addition, the flight information correcting unit 218 calculates the flight speed Vr and the acceleration Vr-a in the rotational direction of the flying object 208 from changes in the distances in the right direction (X3 in FIG. 8) and the left direction (X4 in FIG. 8). The flight information correcting unit 218 calculates the relative indoor height Hd of the flying object 208 from the change in the distance in the downward direction (X5 in FIG. 8). In addition, the flight information correcting unit 218 calculates the distance Rd between the flying object 208 and the structure from the distance in the right direction (X3 in FIG. 8) and the distance in the left direction (X4 in FIG. 8). The flight information correcting unit 218 determines whether or not these pieces of information coincide with the control information on the flight speed V, the relative height H, and the distance R read from marker 206a and marker 206b. If they do not coincide, the flight information correcting unit 218 corrects the flight information so as to coincide with the control information. The control device 204 transmits the corrected flight information to the flying object control unit 210 via the first wireless communication unit 220.

The relative indoor height Hd of the flying object 208 may be appropriately selected by comparing the measured value of the fifth distance sensor 236e with the value of the altimeter unit 234. For example, if the state of the surface below the flying object 208 is not stable and the measured value of the fifth distance sensor 236e varies, it is possible to use just the value of the altimeter unit 234.

The abnormality detection unit 217 detects an abnormality in the control system 202 of the flying object, such as a decrease in the battery voltage of the flying object 208, a case where the next marker 206b cannot be detected by the flying object 208, or a case where the flying object 208 abnormally approaches a structure or the like.

As shown in the table of FIG. 11, the fail-safe code is a code that determines how to control the flying object 208 when the abnormality detection unit 217 detects an abnormality. As shown in FIG. 11, when, for example, the flying object 208 cannot find marker 206b within a predetermined time, the flying object 208 is made to hover. F0001 is defined as a fail-safe code corresponding to this state. As another example, when it is impossible to communicate with the flying object 208, a determination is made to return to a landing base Ba provided at a predetermined position indoors or in a tunnel. The corresponding fail-safe code in defined as F0006. The fail-safe codes in the table of FIG. 11 are stored in the storage device of the control device 204 as a data table Df. Any of the fail-safe codes in the table of FIG. 10 are described (displayed) on marker 206a and marker 206b.

Next, an example of a processing procedure of the control device 204 in the control system 202 of the flying object will be described with reference to FIG. 12. Only the points with respect to which the third embodiment is different from the first embodiment will be described.

In step S201, the control device 204 controls the flying object 208 based on the control information read from marker 206a. For example, when the flight speed V, the distance R to a structure, and the relative height H indoors are described (displayed) as the control information in addition to the movement vector on marker 206a (see the arrow displayed on marker 206a in FIG. 8), the reading unit 212 reads the control information on marker 206a as an image. In addition to the processing procedure of the first embodiment, the control device 204 generates flight information so that the flight speed Vd of the flying object 208, the distance Rd from the structure, and the relative height Hd become the flight speed V, the distance R from the structure, and the relative height H of marker 206a, and it transmits the flight information to the flying object control unit 210. The flying object control unit 210 controls the flying object 208 based on the flight information.

In step S202, the control device 204 detects whether or not an abnormality has occurred in the flying object 208 by the abnormality detection unit 217 and detects an abnormal state. When an abnormal state is detected (Yes in step S202), the control device 204 calls a fail-safe code from the data table Df, it reads a fail-safe code that coincides with the fail-safe code read from marker 206a, and it transmits control information corresponding to the fail safe-code which was read as flight data to the flying object control unit 210 (step S203). For example, it will be assumed that the fail-safe code "F0001" is described (displayed) on marker 206a. When the control device 204 detects that the flying object 208 cannot detect marker 206b within a predetermined time, it calls up the fail-safe code F0001 that was described (displayed) on marker 206a, and it controls the flying object 208 to hover. On the other hand, when the abnormality detection unit 217 does not detect an abnormality (No in step S202), the control device 204 advances the process to step S204.

Since step S204 is the same as in the first embodiment, an explanation thereof will be omitted.

In step S205, in addition to the information read by the reading unit 212 in the first embodiment, the control device 204 reads the flight speed V, the distance R from the structure, the relative height H, and the control information of the fail-safe code F which are described (displayed) on marker 206b.

Since step S206 is the same as in the first embodiment, an explanation thereof will be omitted.

In step S207, the flight information correcting unit 218 of the control device 204 compares the control information of marker 206b, the flight speed Vd of the flying object 208 calculated from the values of the respective distance sensors, the distance Rd to the structure, and the relative height Hd with the value of the control information read in step S205.

In step S208, the flight information correcting unit 218 corrects the flight information of the flying object 208. As an example, it will be assumed that the control information of marker 206a indicates that the distance R to the structure is 30. It will also be assumed that the control information of marker 206b is also 30. In this case, the flying object 208 flies at a constant distance Rd of 30 from the structure. Next it will be assumed that the distance Rd between the flying object 208 and the structure at the position of marker 206b changes to 32 due to some external factor. In this case, the flight information correcting unit 218 corrects the flight information so that the distance Rd from the structure becomes 30. Similarly, by way of example, it will be assumed that the control information of marker 206a is information in which the relative height H changes from 20 to 30, and it will be assumed that the control information on the relative height H of marker 206b changes from 30 to 20. In this case, the flying object 208 flies while changing the relative height Hd with respect to the structure from 20 to 30. It will next be assumed that the height Hd relative to the flying object 208 at the position of marker 206b changes to 32 due to some external factor. In this case, the flight information correcting unit 218 corrects the flight information so that the relative height Hd becomes 30.

Steps S209 to S210 are the same as in the first embodiment, so descriptions thereof will be omitted.

In the control system 202 and the control device 204 of the flying object having the configuration of the third embodiment as described above, the first distance sensor 236a to the fifth distance sensor 236e are provided in the flying object 208, and the control information calculated from each distance sensor is described (displayed) on the marker 206. As a result, the flying object 208 can be more stably and autonomously flown without using a GPS. A fail-safe code is displayed on the marker 206. Therefore, when an abnormality occurs in the flying object 208, the flying object 208 can be made to fly safely in accordance with an indoor or tunnel environment. In addition, even in a state in which an acceleration sensor (not shown) or a gyro (not shown) of the attitude detecting unit 226 does not function, the first to fifth distance sensors 236a to 236e can be used to detect the inclination, the speed, the moving direction, and the like of the flying object 208.

Other Embodiments (a) In the embodiments described above, an unmanned flying object has been described as an example, but the present invention is not limited thereto, and various modifications can be made without departing from the gist of the invention. In particular, the embodiments and variations described herein can be freely combined as necessary.

(b) In the first embodiment described above, arrows and numbers are used as examples of marker 6a and marker 6b, but the present invention is not limited to this example. For example, marker 6a and marker 6b may be displayed as QR codes. When a QR code (registered trademark) is used for marker 6a and marker 6b, a QR code (registered trademark) reader may be stored in advance in the reading unit 12 of the control device 4.

(c) In the second embodiment described above, alphabetic characters are used for marker 106a to marker 106d, but the present invention is not limited thereto. For example, marker 106a to marker 106d may be numbers or simple characters. Alternatively, the movement vector and the imaging start time may be converted into a QR code (registered trademark) and used for marker 106a to marker 106d.

(d) In the embodiments described above, the image obtained by the image capturing unit 22 is used as the detecting unit 16, but the present invention is not limited to this. For example, magnetic force may be detected by using a magnet or the like for markers 6 and 106. In addition, markers 6 and 106 may be detected using infrared rays.

(e) In the first embodiment and the second embodiment described above, the long side and the short side M of the rectangular portions of markers 6 and 106 are used by the flight information correcting unit 18, but the present invention is not limited to this. For example, a long-wave wireless wave, a sound wave, or the like which easily avoids an obstacle may be used. Instead of the long side L and the short side M, a straight portion of a structure around marker 106 may be used.

(f) In the first embodiment and the second embodiment described above, a rectangular frame is used for markers 6 and 106, but the present invention is not limited thereto. Marker 6 and marker 106 may be diamond-shaped or round-shaped.

(g) In the first embodiment described above, marker 6 is arranged at an arbitrary position, but the present invention is not limited to this. The marker 6 may be arranged on top of a self-propelled device. As a result, the flying object 8 can follow the movement of the self-propelled device.

(h) In the third embodiment described above, a first distance sensor 236a to a fifth distance sensor 236e are used, but the number of distance sensors is not limited to this. For example, in the case where two or more distance sensors are arranged in the forward, backward, left, and right directions in the traveling direction of the flying object 208, the rotational direction of the flying object is stabilized, and stabilization of the flight can be expected by controlling the flying object so as to keep the two distances on the right side constant. In addition, instead of a distance sensor, a laser range finder may be used. In this case, the light receiving angles of the laser range finder may be described (displayed) on marker 206a and marker 206b.

(i) In the third embodiment described above, the flight speed V, the distance R to the structure, and the relative height H in the indoor area are described (displayed) on marker 206a and marker 206b, but the values of the respective distance sensors may be described (displayed). Thus, the calculation performed by the flight information correcting unit 218 can be omitted.

(j) In the third embodiment described above, the fail-safe codes shown in the table of FIG. 10 are used, but the present invention is not limited thereto. The fail-safe codes may be defined to correspond to all of the anomalies that may occur in the control system 202 of the flying object.

EXPLANATION OF REFERENCE NUMERALS

2, 102, 202: Flying object control system
4, 204: Control device
6, 106, 206: Marker unit (marker)
8, 208: Flying object
12, 212: Reading unit
14, 214: Flight information transmitting unit
16, 216: Detecting unit
18, 218: Flight information correcting unit
22, 222: Image capturing unit
217: Abnormality detection unit
236 *a*: First distance sensor
236 *b*: Second distance sensor
236 *c*: Third distance sensor
236 *d*: Fourth distance sensor
236 *e*: Fifth distance sensor

The invention claimed is:

1. A control system for a flying object used for controlling a flying object comprising:
    a plurality of markers arranged along a flight route and comprising control information relating to control of the flying object, the control information of a first marker of the plurality of markers comprising:
        control information for the flying object to move from the first marker to a second marker of the plurality of markers along the flight route; and
        fail-safe information relating to behavior of the flying object when an abnormality occurs with respect to the controller or the flying object along the flight route from the first marker to a second marker of the plurality of markers;
    a controller which controls the flying object, wherein the controller includes:
        a reading unit which reads the control information from the plurality of markers;
        a flight information transmitting unit which generates flight information in a form readable by the flying object based on the control information read by the reading unit and transmits the flight information to the flying object; and
        an abnormality detection unit which detects an abnormality with respect to the controller or the flying object,
    wherein upon detection of an abnormality with respect to the controller or the flying object along the flight route from the first marker to a second marker of the plurality of markers, the controller selects and transmits predetermined overriding flight information corresponding to the fail-safe information of the first marker to the flying object.

2. The control system for a flying object according to claim 1, wherein:
    the flying object has an image capturing unit which captures an image described in the marker; and
    the reading unit reads the control information from the image captured by the image capturing device.

3. The control system for a flying object according to claim 2, further comprising a flight information correcting unit which corrects the flight information based on the image.

4. The control system for a flying object according to claim 1, wherein:
    the flying object has a distance sensor for measuring a distance between the flying object and structures surrounding the flying object; and
    the at least one marker has second control information relating to a flight state calculated from information from the distance sensor.

5. The control system for a flying object according to claim 1, wherein:
    the abnormality detection unit detects the abnormality when the flying object detects a decrease in battery voltage.

6. The control system for a flying object according to claim 1, wherein:
    the abnormality detection unit detects the abnormality when the controller cannot read the marker.

7. The control system for a flying object according to claim 1, wherein:
    the abnormality detection unit detects the abnormality when the flying object abnormally approaches a structure.

8. The control system of claim 1, wherein:
    the controller further comprises a storage device storing a plurality of predetermined overriding flight information entries relating to a behavior of the flying object when an abnormality is detected; and
    the controller selects the predetermined overriding flight information corresponding to the fail-safe information of the first marker from among the plurality of predetermined overriding flight information entries.

9. The controller of claim 1, further comprising a storage device storing a plurality of predetermined overriding flight information entries relating to a behavior of the flying object when an abnormality occurs, wherein the controller selects the predetermined overriding flight information corresponding to the fail-safe information of the first marker from among the plurality of predetermined overriding flight information entries.

10. A controller for controlling a flying object comprising:
a reading unit which reads control information from a marker which corresponds to control information relating to control of a flying object, the control information comprising:
   control information for the flying object to move from the marker to a next marker along a flight route; and
   fail-safe information relating to behavior of the flying object when an abnormality occurs with respect to the controller or the flying object along the flight route from the marker to the next marker;
a flight information transmitting unit which generates flight information in a form readable by the flying object and transmits the flight information to the flying object based on the control information read by the reading unit; and
an abnormality detection unit which detects an abnormality with respect to the controller or the flying object,
wherein upon detection of an abnormality with respect to the controller or the flying object along the flight route from the marker to the next marker, the controller selects and transmits predetermined overriding flight information corresponding to the fail-safe information of the marker to the flying object.

11. A marker for use in a flying object control system comprising;
first control information relating to a movement vector of the flying object from the marker to a next marker along a flight route;
second control information relating to a flight state of the flying object from the marker to the next marker along a flight route; and
third control information relating to behavior of the flying object when an abnormality occurs with respect to the flying object or a controller that controls the flying object along the flight route from the marker to the next marker, the third control information corresponding to predetermined overriding flight information for controlling the flying object.

* * * * *